United States Patent [19]

Mäusezahl et al.

[11] Patent Number: 5,298,036
[45] Date of Patent: Mar. 29, 1994

[54] MIXTURE OF DISAZO DYES CONTAINING SULFO-SUBSTITUTED 1,4-NAPHTHALENE MIDDLE COMPONENTS

[75] Inventors: Dieter Mäusezahl, Biel-Benken; Urs Lehmann, Basel, both of Switzerland

[73] Assignee: Ciba-Geigy Corporation, Ardsley, N.Y.

[21] Appl. No.: 914,178

[22] Filed: Jul. 14, 1992

[51] Int. Cl.⁵ .................... C09B 67/22; C09B 31/043; C09B 31/057; D06P 3/24
[52] U.S. Cl. ............................ 8/641; 8/549; 8/643; 8/917; 8/924; 8/929; 534/829
[58] Field of Search .................. 534/829; 8/641, 917, 8/924, 929

[56] References Cited

U.S. PATENT DOCUMENTS

| | | | |
|---|---|---|---|
| 3,960,831 | 1/1976 | Nickel et al. | 534/829 |
| 4,556,401 | 12/1985 | Weitz | 8/641 |

FOREIGN PATENT DOCUMENTS

| | | | |
|---|---|---|---|
| 759868 | 5/1971 | Belgium | 534/829 |
| 66781 | 12/1982 | European Pat. Off. | 534/832 |
| 0141063 | 5/1985 | European Pat. Off. | |
| 0356080 | 2/1990 | European Pat. Off. | |
| 3724037 | 2/1989 | Fed. Rep. of Germany | |
| 2070752 | 9/1971 | France | |
| 1062255 | 3/1967 | United Kingdom | 534/829 |
| 1265428 | 3/1972 | United Kingdom | |
| 1298280 | 11/1972 | United Kingdom | |
| 1322704 | 7/1973 | United Kingdom | 534/829 |

OTHER PUBLICATIONS

CAS Registry Handbook, Registry No. 50791-83-9 (1974).

*Primary Examiner*—Mary C. Lee
*Assistant Examiner*—Fiona T. Powers
*Attorney, Agent, or Firm*—Kevin T. Mansfield; Edward McC. Roberts

[57] ABSTRACT

Azo dyes of the formula

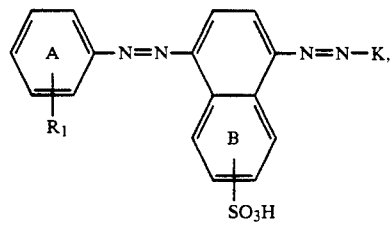

(1)

in which $R_1$ and K are as defined in claim 1, produce on nitrogen-containing or hydroxyl-containing fibre materials dyeings having good fastness properties.

11 Claims, No Drawings

MIXTURE OF DISAZO DYES CONTAINING SULFO-SUBSTITUTED 1,4-NAPHTHALENE MIDDLE COMPONENTS

The present invention relates to novel azo dyes, processes for their preparation and the use of these dyes for the dyeing and printing of fibre materials, in particular textile fibre materials.

The present invention relates to azo dyes of the formula

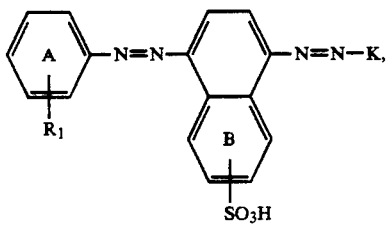

(1)

in which
R$_1$ is a radical of the formula —NH—CO—R$_2$ or —CO—N(R$_3$)R$_4$, R$_2$ is amino or unsubstituted or halogen-, hydroxyl- or C$_1$-C$_4$alkoxy-substituted C$_1$-C$_4$alkyl, R$_3$ and R$_4$, independently of one another, are hydrogen, C$_1$-C$_4$alkyl or C$_2$-C$_4$hydroxyalkyl, and K is a radical of the formula

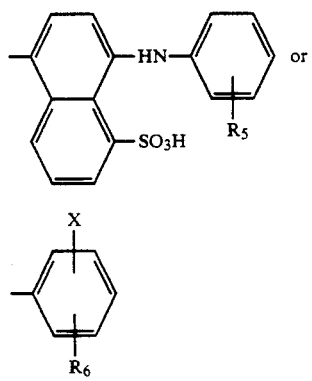

(2)

or (3)

R$_5$ and R$_6$ are hydrogen or C$_1$-C$_4$alkyl, X is C$_1$-C$_4$alkoxy, C$_2$-C$_4$hydroxyalkoxy or a radical of the formula -N(R$_7$)R$_8$ and R$_7$ and R$_8$, independently of one another, are C$_1$-C$_4$alkyl which is unsubstituted or substituted by hydroxyl or by phenyl which may be further substituted, in which, if R$_1$ is the group —NH—CO—R$_2$ and K is a radical of the formula (2), the group —NH—CO—R$_2$ is bound to the benzene ring A in the 3 position, relative to the azo group.

R$_2$, R$_3$, R$_4$, R$_5$, R$_6$, R$_7$ and R$_8$ as C$_1$-C$_4$alkyl are methyl, ethyl, n-propyl, isopropyl, n-butyl, sec-butyl, isobutyl or tert-butyl. The radical R$_2$ as C$_1$-C$_4$alkyl can be substituted by halogen, for example fluorine, bromine or in particular chlorine, hydroxyl or C$_1$-C$_4$alkoxy, for example methoxy, ethoxy, n-propoxy, isopropoxy, n-butoxy or sec-butoxy. The radicals R$_7$ and R$_8$ as C$_1$-C$_4$alkyl can be substituted, independently of one another, by hydroxyl or phenyl which may be further substituted, examples of suitable substituents of the phenyl radical being sulfo, nitro, halogen, such as fluorine, bromine or in particular chlorine, C$_1$-C$_4$alkyl, such as methyl, ethyl, n-propyl, isopropyl, n-butyl, sec-butyl, isobutyl or tert-butyl, or C$_1$-C$_4$alkoxy, for example methoxy, ethoxy, n-propoxy, isopropoxy, n-butoxy or sec-butoxy. A particularly suitable substituent of the phenyl radical mentioned is the sulfo group.

R$_3$ and R$_4$ as C$_2$-C$_4$hydroxyalkyl are a straight-chain or branched hydroxyalkyl radical, for example a β-hydroxyethyl, β-hydroxypropyl, β-hydroxybutyl or α-ethyl-β-hydroxyethyl radical.

Examples of X as C$_1$-C$_4$alkoxy are methoxy, ethoxy, n-propoxy, isopropoxy, n-butoxy or sec-butoxy, in particular methoxy.

X as C$_2$-C$_4$hydroxyalkoxy is a straight-chain or branched hydroxyalkoxy radical, for example a β-hydroxyethoxy, β-hydroxypropoxy, β-hydroxybutoxy or β-ethyl-β-hydroxyethoxy radical. Of these, the β-hydroxyethoxy radical is preferred.

Preference is given to azo dyes of the formula (1) in which the sulfo group is bound to benzene ring B in the 6 or 7 position, relative to one of the azo groups.

Preference is also given to azo dyes of the formula (1) in which R$_2$ is C$_1$-C$_4$alkyl, in particular C$_2$-C$_4$alkyl. Preferably, R$_2$ is ethyl.

R$_3$ and R$_4$, independently of one another, are preferably hydrogen or C$_2$-C$_4$hydroxyalkyl, in particular hydrogen or β-hydroxyethyl.

R$_5$ and R$_6$, independently of one another, are preferably hydrogen or methyl, R$_5$ being in particular hydrogen.

R$_7$ and R$_8$, independently of one another, are preferably C$_1$-C$_4$alkyl or C$_2$-C$_4$hydroxyalkyl.

K as a radical of the formula (3) is preferably a radical of the formula

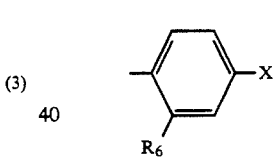

(4)

in which X and R$_6$ are as defined in formula (1); preferably, R$_6$ is hydrogen or methyl.

Of particular interest are azo dyes of the formula (1) in which R$_1$ is a radical of the formula —NH—CO—R$_2$ and R$_2$ is as defined in formula (1), K is a radical of the formula (2) or a radical of the formula

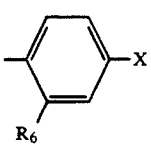

(4)

in which R$_6$ is as defined in formula (1) and X is C$_1$-C$_4$alkoxy, C$_2$-C$_4$hydroxyalkoxy or a radical of the formula —N(R$_7$)R$_8$ and R$_7$ and R$_8$, independently of one another, are C$_1$-C$_4$alkyl or C$_2$-C$_4$hydroxyalkyl, in which, if K is a radical of the formula (2), the group —NH—CO—R$_2$ is bound to the benzene ring A in the 3 position, relative to the azo group.

Preference is given to azo dyes of the formula (1) in which R$_1$ is a radical of the formula —NH—CO—R$_2$. In these azo dyes, R$_2$ is preferably C$_2$-C$_4$alkyl, in particular ethyl.

Further preference is given to azo dyes of the formula (1) in which the radical $R_1$ is bound to the benzene ring A in the 3 position, relative to the azo group.

Preferably, the azo dyes of the formula (1) contain a radical K of the formula (3), in which the abovementioned meanings and preferences apply to the radical of the formula (3).

Furthermore, preference is given to azo dyes of the formula (1) in which X is $C_1$-$C_4$alkoxy, $C_2$-$C_4$hydroxyalkoxy or a radical of the formula —$N(R_7)R_8$ and $R_7$ and $R_8$, independently of one another, are $C_1$-$C_4$alkyl or $C_2$-$C_4$hydroxyalkyl.

Of interest are furthermore azo dyes of the formula (1) in which K is a radical of the formula (2) and $R_5$ is as defined in formula (1), in particular in which $R_5$ is hydrogen or methyl, preferably hydrogen. In azo dyes which contain a radical K of the formula (2), $R_1$ is preferably the group of the formula —NH—CO—$R_2$, the abovementioned meanings and preferences applying to $R_2$.

Very particular preference is given to azo dyes of the formula

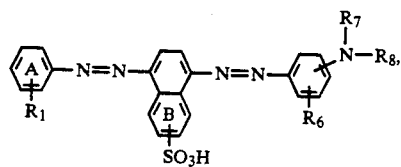 (5)

in which $R_1$, $R_6$, $R_7$ and $R_8$ have the abovementioned meanings and preferences, in particular to azo dyes of the formula

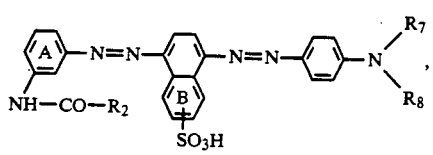 (6)

in which $R_2$ is methyl or ethyl and $R_7$ and $R_8$, independently of one another, are ethyl or β-hydroxyethyl.

Very particular preference is also given to azo dyes of the formula

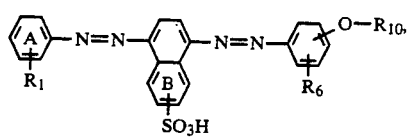 (7)

in which $R_1$ and $R_6$ have the abovementioned meanings and preferences and $R_{10}$ is $C_1$-$C_4$alkyl or $C_2$-$C_4$hydroxyalkyl, in particular to azo dyes of the formula

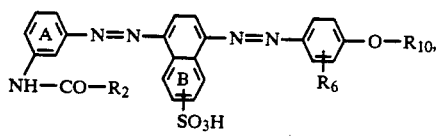 (8)

in which $R_2$ is methyl or ethyl, $R_6$ is hydrogen or methyl and $R_{10}$ is methyl, ethyl or β-hydroxyethyl.

Very particular preference is furthermore given to azo dyes of the formula

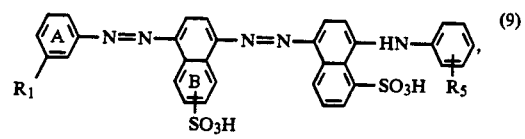 (9)

in which $R_1$ and $R_5$ have the abovementioned meanings and preferences, in particular to azo dyes of the formula

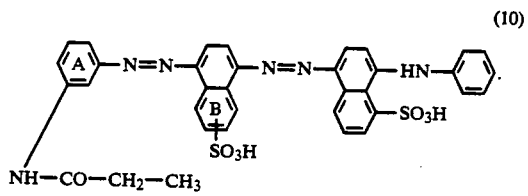 (10)

Particularly important azo dyes are those of the formulae (5), (7) and (9), in particular those of the formulae (6), (8) and (10).

Of very particular interest are azo dyes of the formulae

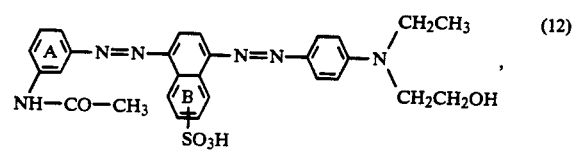 (12)

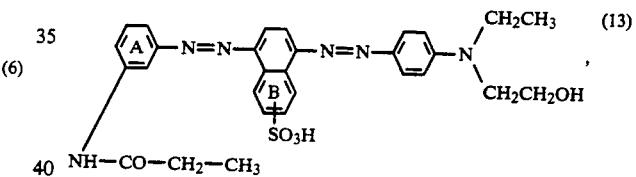 (13)

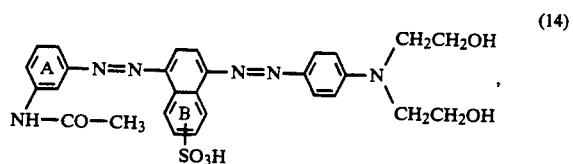 (14)

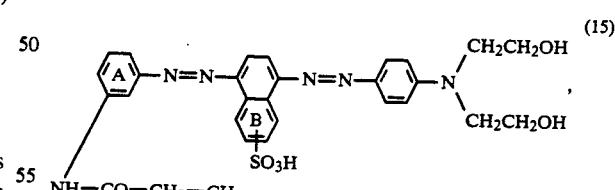 (15)

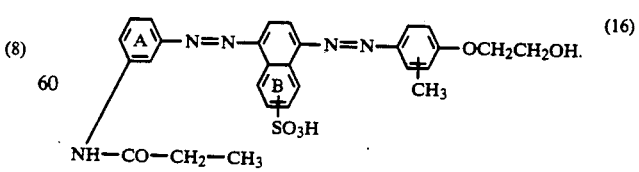 (16)

Of very particular interest is furthermore the azo dye of the formula (10).

The invention also relates to dye mixtures comprising at least two of the dyes according to the invention of the formula (1). The abovementioned meanings and preferences apply to the dyes of the formula (1).

Particularly interesting dye mixtures are mixtures of isomers of the dyes according to the invention, which contain one azo dye of the formula

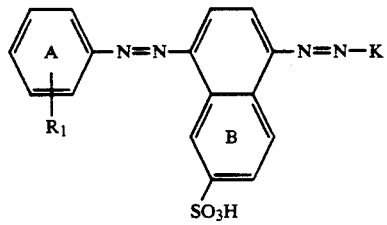
(1a)

and one azo dye of the formula

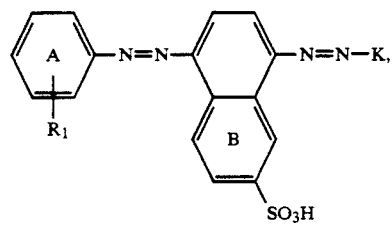
(1b)

K and $R_1$ being as defined in formula (1). The dyes of the formulae (1a) and (1b) of the mixtures of isomers thus only differ with respect to the position of the sulfo group bound to benzene ring B. The preferences mentioned above for the azo dyes of the formula (1) apply to the mixtures of isomers of the dyes of the formula (1a) and (1b).

The invention furthermore relates to a process for the preparation of the azo dyes of the formula (1), which comprises diazotising an amine of the formula

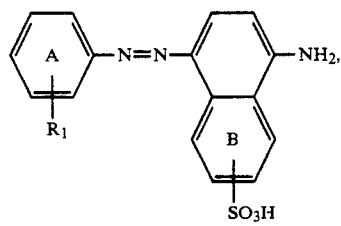
(17)

in which $R_1$ is as defined in formula (1), and coupling the product onto a coupling component of the formula

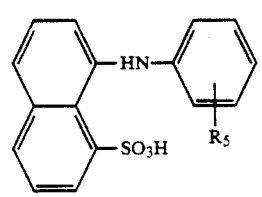
(18)

or

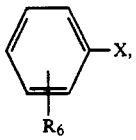
(19)

in which X is a radical of the formula $-N(R_7)R_8$ and $R_5$, $R_6$, $R_7$ and $R_8$ are as defined in formula (1), or diazotising an amine of the formula (17), coupling the product onto a coupling component of the formula

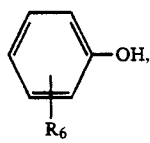
(20)

in which $R_6$ is as defined in formula (1), and then reacting the hydroxyl group with an alkylating agent to give a $C_1$-$C_4$alkoxy or $C_2$-$C_4$hydroxyalkoxy group.

The amines of the formula (17) and the coupling components of the formulae (18), (19) and (20) are known or can be prepared in analogy to known processes.

Thus, for example, the amines of the formula (17) are obtained by diazotisation of a compound of the formula

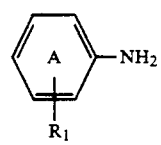
(21)

followed by coupling of the product onto a coupling component of the formula

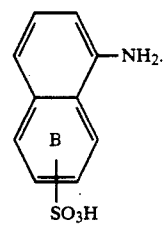
(22)

Diazotisation of the amines of the formulae (17) and (21) is carried out in a manner known per se, for example using a nitrite, for example using an alkali metal nitrite, such as sodium nitrite, in a mineral acid medium, for example in a hydrochloric acid medium, at temperatures of, for example, $-5°$ to $30°$ and preferably at $0°$ to $10°$ C.

Coupling onto the coupling components of formulae (18), (19), (20) and (22) takes place in each case in a manner known per se at acid, neutral or weakly alkaline pH values and temperatures of, for example, $0°$ to $30°$ C.

Alkylation takes place, for example, in an aqueous medium, at a neutral to alkaline pH and a temperature of, for example, $20°$ to $40°$ C. Examples of the alkylating agents used are di($C_1$-$C_4$alkyl)sulfate, $C_1$-$C_4$alkyl halide, di($C_1$-$C_4$alkyl)carbonate, $C_1$-$C_4$alkyl phosphonate and $C_1$-$C_4$alkylene oxide. Examples are dimethyl sulfate, diethyl sulfate, chloroethanol, ethylene carbonate, ethylene oxide, propylene oxide and butylene oxide.

Examples of compounds of the formula (21) are 3- or 4-acetylaminoaniline, 3- or 4-propionylaminoaniline, 3- or 4-aminocarbonylaniline and 3- or 4-(N-β-hydroxyethylaminocarbonyl)aniline.

Examples of coupling components of the formula (22) are 1-aminonaphthalene-6-sulfonic acid, 1-aminonaphthalene-7-sulfonic acid and a mixture of 1-aminonaphthalene-6-sulfonic acid and 1-aminonaphthalene-7-sulfonic acid.

Examples of coupling components of the formula (18) are 1-phenylaminonaphthalene-8-sulfonic acid and 1-(4'-methylphenylamino)naphthalene-8-sulfonic acid.

Examples of coupling components of the formula (19) are N-ethyl-N-β-hydroxyethylaniline and N,N-di(β-hydroxyethyl)aniline.

The substituents $R_1$ of the amines of the formula (17) and the substituents $R_5$, $R_6$ and X of the coupling components of the formulae (18), (19) and (20) have the abovementioned meanings and preferences.

In a particularly preferred embodiment of the process according to the invention, an amine of the formula (17) is diazotised and the product is coupled onto a coupling component of the formula

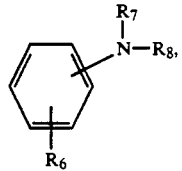

(23)

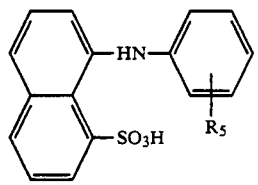

(24)

or

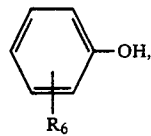

(25)

in which $R_5$, $R_6$, $R_7$ and $R_8$ have the abovementioned meanings and preferences, and the hydroxyl group of the coupling component of the formula (25) is then reacted with an alkylating agent to give a $C_1$–$C_4$alkoxy or $C_2$–$C_4$hydroxyalkoxy group.

The dyes of the formula (1) are present either in the form of their free acid or preferably as salts thereof.

Examples of suitable salts are the alkali metal salts or ammonium salts or the salts of an organic amine.

Examples are the sodium salts, lithium salts, potassium salts or ammonium salts or the salt of mono-, di- or triethanolamine.

The azo dyes according to the invention of the formula (1) and the dye mixtures according to the invention are suitable for the dyeing and printing of nitrogen-containing or hydroxyl-containing fibre materials, paper or leather, for example textile fibre materials made of cellulose, silk and in particular natural and synthetic polyamides, by methods known per se. The azo dyes according to the invention of the formula (1) and the dye mixtures according to the invention can be used for dyeing or printing in a generally customary, previously treated or untreated form. Level dyeings in blue, red or yellow hues having good general fastness properties, in particular good rub, wet, wetrub and light fastness are obtained. Furthermore, the dyes according to the invention are readily water-soluble. Moreover, the dyes according to the invention have good buildup properties and good compatibility with other dyes. The abovementioned textile material can be present in a wide range of processing forms, for example as fibre, yarn, woven fabric or knitted fabric.

The invention also relates to a process for the trichromatic dyeing or printing of natural or synthetic polyamide fibre materials, in which at least one red-dyeing dye of the formula

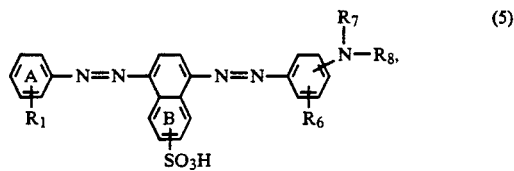

(5)

in which $R_1$ is a radical of the formula —NH—CO—$R_2$ or —CO—N($R_3$)$R_4$, $R_2$ is amino or unsubstituted or halogen-, hydroxyl- or $C_1$–$C_4$alkoxy-substituted $C_1$–$C_4$alkyl, $R_3$ and $R_4$, independently of one another, are hydrogen, $C_1$–$C_4$alkyl or $C_2$–$C_4$hydroxyalkyl, $R_6$ is hydrogen or $C_1$–$C_4$alkyl, and $R_7$ and $R_8$, independently of one another, are $C_1$–$C_4$alkyl which is unsubstituted or substituted by hydroxyl or phenyl which may be further substituted, is used together with at least one yellow- or orange-dyeing dye and at least one blue-dyeing dye.

The radicals $R_1$, $R_6$, $R_7$ and $R_8$ of the red-dyeing dye of the formula (5) have the abovementioned preferences. Preferably, the red-dyeing dye of the formula (5) used is at least one dye of the formula (6) and very particularly preferably at least one dye of the formulae (12), (13), (14) and (15).

The yellow- or orange-dyeing dye used is preferably at least one of the dyes of the formulae (7),

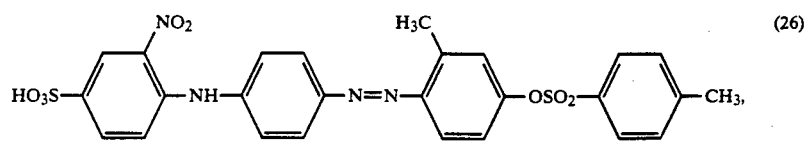

(26)

-continued

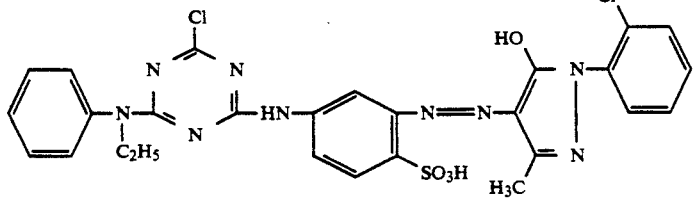
(27)

and

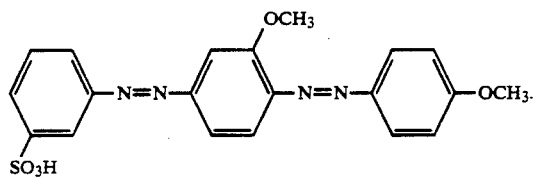
(28)

Particularly preferred yellow- or orange-dyeing dyes are the dyes of the formulae (7), (26), (27) and (28), in particular the dyes of the formulae (8), (26), (27) and (28).

The blue-dyeing dye used is preferably at least one of the dyes of the formulae

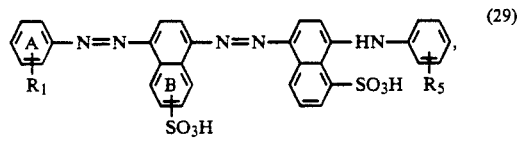
(29)

in which $R_1$ and $R_5$ have the abovementioned meanings and preferences, and

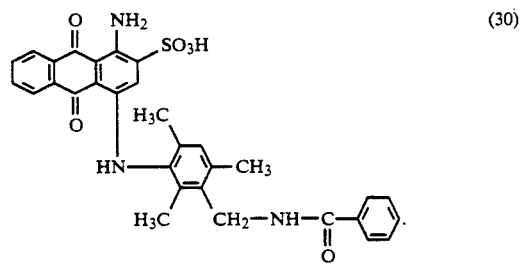
(30)

Particularly preferred blue-dyeing dyes are the dyes of the formulae (9) and (30), in particular the dyes of the formulae (10) and (30).

In a particularly important embodiment of the process according to the invention for the trichromatic dyeing or printing, at least one red-dyeing dye of the formula (5) is used together with at least one yellow- or orange-dyeing dye of the formulae (7) and (26) and at least one blue-dyeing dye of the formula (29), the dyes of the formulae (5), (7) and (29) having the abovementioned meanings and preferences.

In an extremely important embodiment of the process according to the invention for the trichromatic dyeing or printing, at least one red-dyeing dye of the formula (5) is used together with one yellow- or orange-dyeing dye of the formula (26) and one blue-dyeing dye of the formula (30), the dyes of the formula (5) having the abovementioned meanings and preferences.

The process according to the invention for the trichromatic dyeing or printing can be applied to the customary dyeing or printing processes. The dye liquors or printing pastes can contain, in addition to water and the dyes, further additives, for example wetting agents, antifoams, levelling agents or agents affecting the property of the textile material, for example softeners, additives for flameproof finish or soil-, water- and oil-repellent agents and water softeners and natural or synthetic thickeners, for example alginates and cellulose ether.

The process according to the invention is suitable in particular for dyeing from short liquors, for example in continuous dyeing processes or batchwise and continuous foam-dyeing processes.

The dyes used in the process according to the invention are distinguished in trichromatic dyeing or printing by a uniform colour buildup, good affinity, good constancy of shade even in different concentrations, good fastness properties and in particular very good compatibility.

The process according to the invention is suitable for the dyeing or printing not only of natural polyamide fibre materials, for example wool, but in particular also of synthetic polyamide fibre materials, for example nylon 6 or nylon 6.6, and it is suitable for the dyeing or printing of wool and synthetic polyamide blended fabrics or yarns.

The textile material mentioned can be present in a wide range of processing forms, for example as fibre, yarn, woven fabric or knitted fabric and in particular in the form of carpets.

In the examples which follow, parts are by weight. Temperatures are degrees centigrade. Parts by weight relate to parts by volume as the gram relates to the cubic centimeter.

EXAMPLE 1

17.4 parts of 3-aminoacetanilide are suspended in 200 parts of water at room temperature, and 27 parts of concentrated hydrochloric acid are added. The mixture is cooled to a temperature of 5° to 10° by addition of ice, and 25.5 parts of a 4N sodium nitrite solution are added with thorough stirring. Stirring at a temperature of 0° to 5° is continued for one hour, and excess nitrite is then destroyed by addition of 0.5 part of sulfamic acid. A separately prepared solution of 23.7 parts of a weakly alkaline mixture of 1-aminonaphthalene-6-sulfonic acid and 1-aminonaphthalene-7-sulfonic acid, 280 parts of water and 11 parts of concentrated sodium hydroxide solution is then added dropwise. The pH is then brought to a value of 4 with concentrated sodium hydroxide solution, and stirring at room temperature is continued overnight. After addition of sodium chloride, the reaction product is filtered off, washed with 100 parts of 10% aqueous sodium chloride solution and dried, giving 35.5 parts of a reaction product which, in the form of the free acid, corresponds to a mixture of isomers comprising the compounds of the formulae

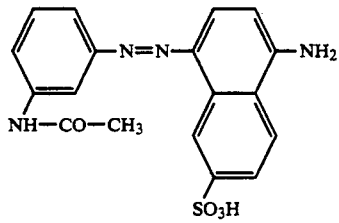
(101)

and

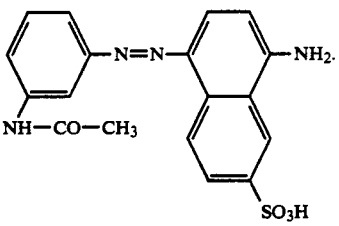
(102)

The compounds of the formulae (101) and (102) can also be obtained individually by using 1-aminonaphthalene-6-sulfonic acid or 1-aminonaphthalene-7-sulfonic acid instead of the mixture of 1-aminonaphthalene-6- and -7-sulfonic acid.

EXAMPLES 2 TO 5

The procedure described in Example 1 is repeated, except that an equimolar amount of 3-propionylaminoaniline, 3-aminocarbonylaniline, 4-aminocarbonylaniline or 3-(N-β-hydroxyethylaminocarbonyl)aniline is used instead of 17.4 parts of 3-aminoacetanilide, giving the mixtures of isomers listed in Table 1 in the form of the free acids.

TABLE 1

| Ex. | Mixture of isomers |
|---|---|
| 2 | 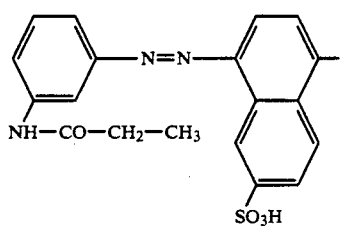 (103) and 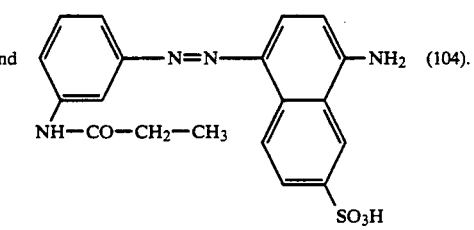 (104). |
| 3 | 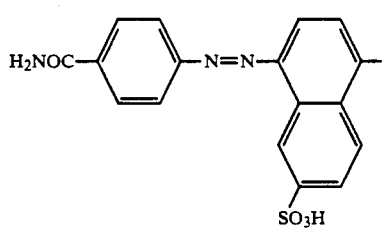 (105) and 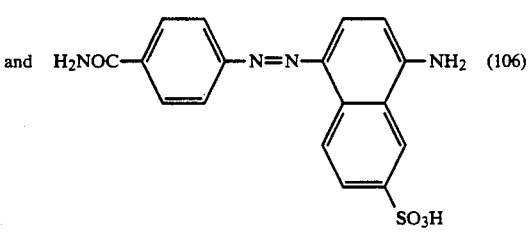 (106) |
| 4 | 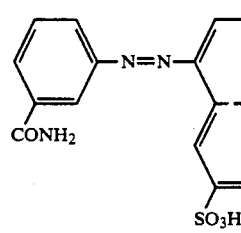 (107) and 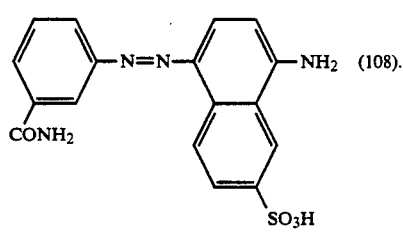 (108). |
| 5 | 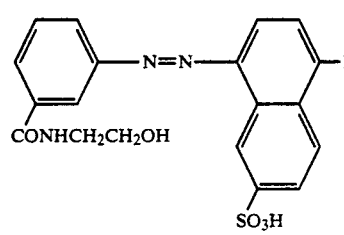 (109) and 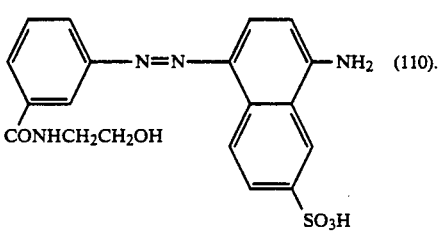 (110). |

The compounds of the mixtures of isomers listed in Table 1 can also be obtained individually by using 1-aminonaphthalene-6-sulfonic acid or 1-aminonaphthalene-7-sulfonic acid instead of the mixture of 1-aminonaphthalene-6- and -7-sulfonic acid.

EXAMPLE 6

6.6 parts of the mixture of isomeric compounds of the formulae (101) and (102) obtained according to Example 1 are dissolved in 150 parts of water and 1.5 parts of concentrated sodium hydroxide solution at a temperature of 40°. After addition of 1.3 parts of a 4N sodium nitrite solution, the reaction mixture is cooled to a temperature of 5° by addition of ice. 7.6 parts of concentrated hydrochloric acid are added dropwise, and the mixture is stirred overnight at a temperature of 0° to 10°. Excess nitrite is then destroyed by addition of 0.4 part of sulfamic acid. A separately prepared solution of 2.5 parts of N-ethyl-N-β-hydroxyethylaniline and 23 parts of 1N aqueous hydrochloric acid solution is then added. The pH is then maintained at a value of 4.7 to 5.3 by addition of concentrated sodium hydroxide solution, the reaction mixture is stirred at a temperature of 5° to 10° for 30 minutes, and stirring at room temperature is continued for another 3 hours. Filtration and drying gives 7.7 parts of a reaction product which, in the form of the free acid, corresponds to the mixture of isomers comprising the dyes of the formulae

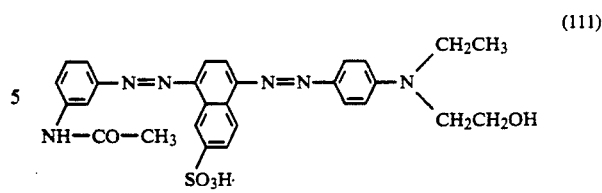

and

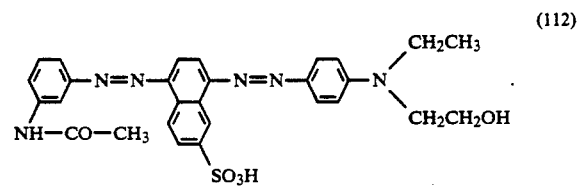

The mixture of dye isomers of the formulae (111) and (112) dyes natural and synthetic polyamide fibre material in bordeaux hues.

The dyes of the formulae (111) and (112) can also be obtained individually by using in Example 6 the corresponding individual compound instead of a mixture of the compounds of the formulae (101) and (102).

EXAMPLES 7 TO 10

The procedure described in Example 6 is repeated, except that an equimolar amount of a mixture of isomers according to one of Examples 2 to 5 is used instead of 6.6 parts of the mixture of isomeric compounds of the formulae (101) and (102), giving the dye isomer mixtures listed in Table 2 in the form of the free acids, which dye natural and synthetic polyamide fibre material in bordeaux hues.

TABLE 2

| Ex. | Dye isomer mixture |
|---|---|
| 7 | 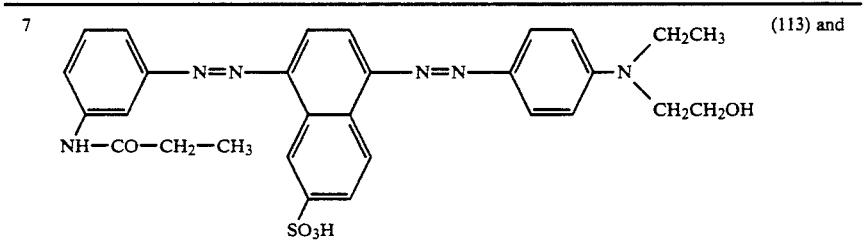 (113) and 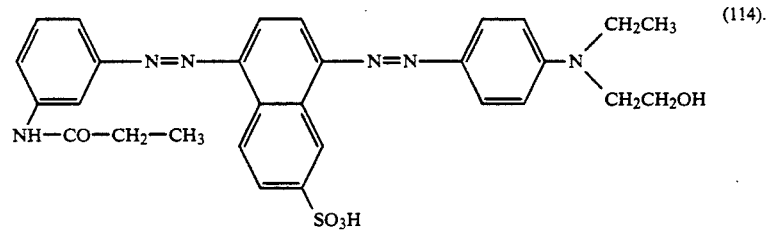 (114) |
| 8 | 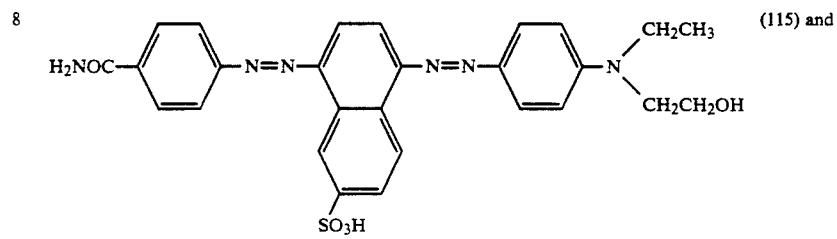 (115) and |

TABLE 2-continued

| Ex. | Dye isomer mixture |
|---|---|

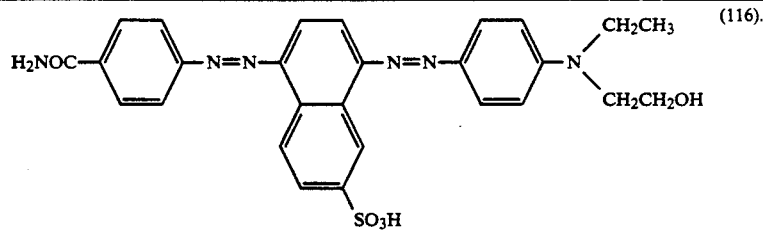 (116).

9 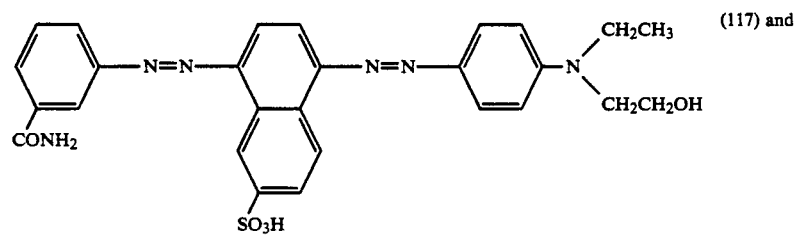 (117) and (118).

10 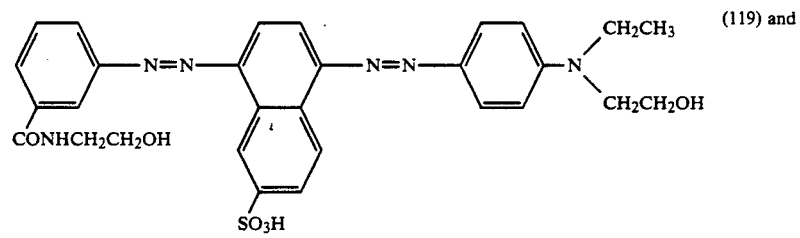 (119) and (120).

The dyes comprising the mixtures of isomers listed in Table 2 can also be obtained individually by using the corresponding individual compound instead of a mixture of isomers according to Examples 2 to 5.

EXAMPLE 11

8.8 parts of the mixture of isomeric compounds of the formulae (101) and (102) obtained according to Example 1 are dissolved in 200 parts of water and 1.0 part of concentrated sodium hydroxide solution at room temperature. After addition of 1.72 parts of a 4N sodium nitrite solution, the reaction mixture is cooled to a temperature of about 1° by addition of ice. 10 parts of concentrated hydrochloric acid are added dropwise, and the mixture is stirred overnight at a temperature of 0° to 10°. Excess nitrite is then destroyed by addition of 0.6 part of sulfamic acid, and the pH of the mixture is brought to a value of 2 with 3.5 parts of calcined sodium carbonate. A separately prepared solution of 3.6 parts of N,N-di($\beta$-hydroxyethyl)aniline and 30 parts of 1N aqueous hydrochloric acid solution is then added. The pH is then maintained at a value of 5 to 5.5 by addition of concentrated sodium hydroxide solution, the reaction mixture is stirred at a temperature of 5° to 10° for 20 minutes, brought to a pH of 8 with concentrated sodium hydroxide solution and heated to 20°. After addition of sodium chloride, the reaction product is filtered off and dried, giving 9 parts of a reaction product which, in the form of the free acid, corresponds to the mixture of isomers comprising the dyes of the formulae

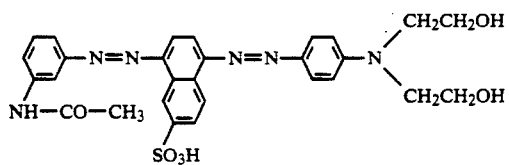
(121)

and

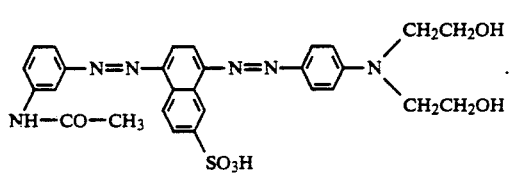
(122)

The mixture of dye isomers of the formulae (121) and (122) dyes natural and synthetic polyamide fibre material in bordeaux hues.

The dyes of the formulae (121) and (122) can also be obtained individually by using in Example 11 the corresponding individual compound instead of a mixture of the compounds of the formulae (101) and (102).

EXAMPLES 12 TO 15

The procedure described in Example 11 is repeated, except that an equimolar amount of a mixture of isomers according to one of Examples 2 to 5 is used instead of 8.8 parts of the mixture of isomeric compounds of the formulae (101) and (102), giving the dye isomer mixtures listed in Table 3 in the form of the free acids, which dye natural and synthetic polyamide fibre material in bordeaux hues.

TABLE 3

| Ex. | Dye isomer mixture |
|---|---|
| 12 | (123) and (124). |
| 13 | (125) and (126). |

TABLE 3-continued

| Ex. | Dye isomer mixture | |
|---|---|---|
| 14 | 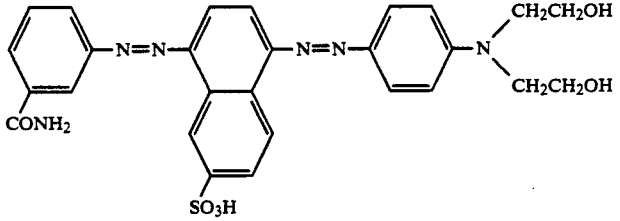 | (127) and |
| | 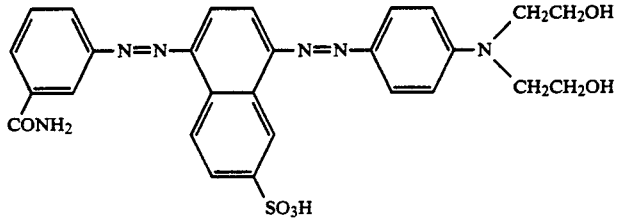 | (128). |
| 15 | 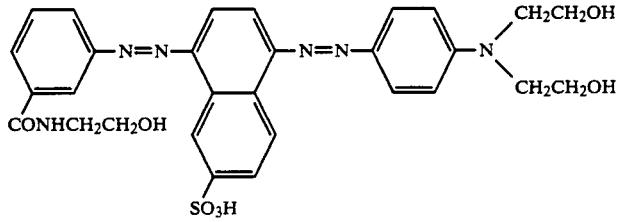 | (129) and |
| | 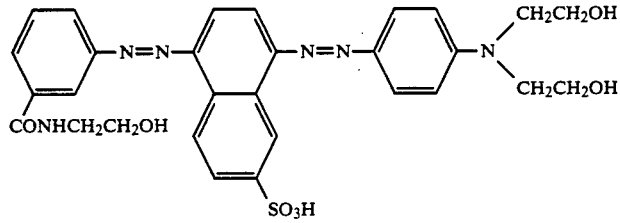 | (130). |

The dyes comprising the mixtures of isomers listed in Table 3 can also be obtained individually by using the corresponding individual compound instead of a mixture of isomers according to Examples 2 to 5.

EXAMPLE 16

A suspension of 37.4 parts of the mixture of isomeric compounds of the formulae (101) and (102) obtained according to example 1 in 600 parts of water is brought to a pH of 12 by addition of 10N sodium hydroxide solution. The suspension is cooled to a temperature of about 2° by addition of 25 parts of ice. 31 parts of a 4N sodium nitrite solution are added, 55 parts of 10N hydrochloric acid are added dropwise over a period of 5 minutes with thorough stirring, and the mixture is stirred at a temperature of 6° to 10° for 14 hours. Excess nitrite is then destroyed by addition of 1.2 parts of sulfamic acid, and the pH of the mixture is brought to a value of 1.5 with 14 parts of sodium carbonate. A separately prepared solution of 150 parts of water, 29.9 parts of 1-phenylaminonaphthalene-8-sulfonic acid, 2.5 parts of disodium hydrogen phosphate ×12 H₂O and 5.5 parts of 10N sodium hydroxide solution are then added over a period of 30 minutes. 15 parts of 10N sodium hydroxide solution are uniformly metered in over a period of one hour, 22 parts of sodium chloride are then sprinkled in, and the mixture is stirred at room temperature for another 2.5 hours. Filtration and drying give 76.2 parts of reaction product which, in the form of the free acid, corresponds to the mixture of isomers comprising the dyes of the formulae

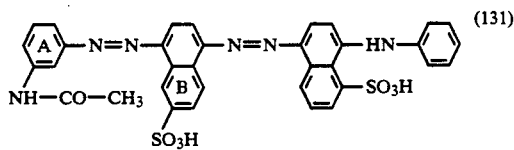 (131)

and

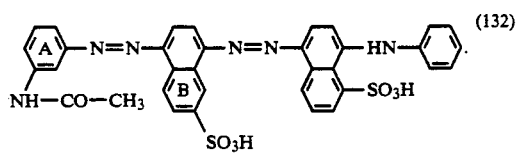 (132)

The mixture of dye isomers of the formulae (131) and (132) dyes natural and synthetic polyamide fibre material in navy hues.

The dyes of the formulae (131) and (132) can also be obtained individually by using in Example 16 the corresponding individual compound instead of a mixture of the compounds of the formulae (101) and (102).

EXAMPLES 17 TO 20

The procedure described in Example 16 is repeated, except that an equimolar amount of a mixture of isomers according to one of Examples 2 to 5 is used instead of 37.4 parts of the mixture of isomeric compounds of the formulae (101) and (102), giving the dye isomer mixtures listed in Table 4 in the form of the free acids, which dye natural and synthetic polyamide fibre material in blue hues.

TABLE 4

| Ex. | Dye isomer mixture | |
|---|---|---|
| 17 | [structure] | (133) and |
| | [structure] | (134). |
| 18 | [structure] | (135) and |
| | [structure] | (136). |
| 19 | [structure] | (137) and |
| | [structure] | (138). |

TABLE 4-continued

| Ex. | Dye isomer mixture |
|---|---|
| 20 | (structure 139) and (structure 140) |

The dyes comprising the mixtures of isomers listed in Table 4 can also be obtained individually by using the corresponding individual compound instead of a mixture of isomers according to Examples 2 to 5.

EXAMPLE 21

A suspension of 49.1 parts of moist filter material of the mixture of isomeric compounds of the formulae (103) and (104) obtainable according to Example 2 in 200 parts of water is brought to a pH of 12 by addition of 10N sodium hydroxide solution. After addition of 15.5 parts of a 4N sodium nitrite solution, the suspension is added dropwise to a solution of 100 parts of ice water and 50 parts of 1-naphthalenesulfonic acid over a period of 30 minutes with thorough stirring, and the solution is then stirred at a temperature of 5° to 10° for two hours. Excess nitrite is then destroyed with sulfamic acid. A separately prepared solution of 75 parts of water, 14.9 parts of N-benzyl-N-ethyl aniline-3'-sulfonic acid and 11.8 parts of 5N sodium hydroxide solution is then added over a period of 30 minutes. 35 parts of sodium acetate $\times 3H_2O$ are then uniformly added over a period of one hour. Stirring of the suspension at room temperature is continued for 4 hours. Evaporation on a rotary evaporator gives 84.6 parts of a reaction product which, in the form of the free acid, corresponds to the mixture of isomers comprising the dyes of the formulae

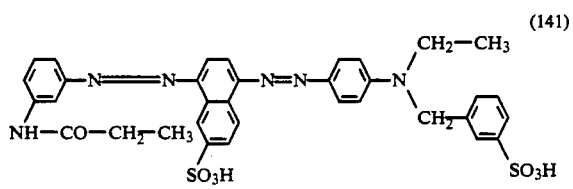

and

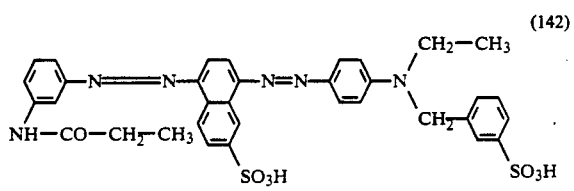

The mixture of dye isomers of the formula (141) and (142) dyes natural and synthetic polyamide fibre material in red-brown hues.

The dyes of the formulae (141) and (142) can also be obtained individually by using in Example 21 the corresponding individual compound instead of a mixture of the compounds of the formula (103) and (104).

EXAMPLE 22

199.6 parts of a moist filter material of the mixture of isomeric compounds of the formulae (101) and (102) obtainable according to Example 1 are stirred at room temperature in 600 parts of water and 10N sodium hydroxide solution at a pH of 12. After addition of 31 parts of a 4N sodium nitrite solution, the reaction mixture is cooled to a temperature of about 1° by addition of ice. 55 parts of concentrated hydrochloric acid are added dropwise, and the mixture is stirred overnight at a temperature of 0° to 10°. Excess nitrite is then destroyed by addition of 0.6 part of sulfamic acid, and the pH of the mixture is brought to a value of 1.5 with 29 parts of sodium bicarbonate. A separately prepared solution of 50 parts of water, 9.4 parts of phenol and 10 parts of concentrated sodium hydroxide solution is then added. The pH is then maintained at a value of about 8.5 to 9 by addition of concentrated sodium hydroxide solution, the reaction mixture is stirred at a temperature of 5° to 10° for 30 minutes, brought to a pH of 11 with concentrated sodium hydroxide solution and heated to 20°. After addition of sodium chloride and 52 parts of an aqueous 5N hydrochloric acid solution, the reaction product is filtered off and dried, giving 53.5 parts of a reaction product which, in the form of the free acid, corresponds to the mixture of isomers comprising the dyes of the formulae

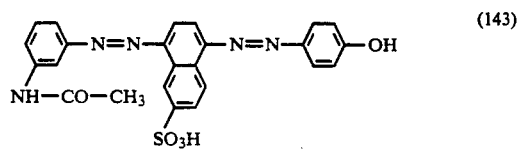

and

-continued

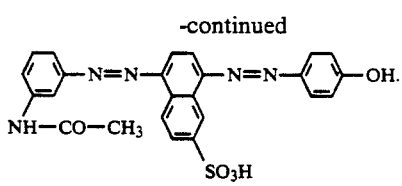
(144)

The dyes of the formulae (143) and (144) can also be obtained individually by using in Example 22 the corresponding individual compound instead of a mixture of the compounds of the formulae (101) and (102).

EXAMPLES 23 TO 30

The procedure described in Example 22 is repeated, except that, if desired, an equimolar amount of o-cresol, m-cresol or p-cresol is used instead of 9.4 parts of phenol and, if desired, an equimolar amount of a mixture of isomers according to one of Examples 2 to 5 is used instead of 199.6 parts of the mixture of isomeric compounds of the formulae (101) and (102), giving the dye isomer mixtures listed in Table 5 in the form of the free acids.

TABLE 5

| Ex. | Dye isomer mixture | |
|---|---|---|
| 23 | (structure) | (145) and |
|  | (structure) | (146). |
| 24 | (structure) | (147) and |
|  | (structure) | (148). |
| 25 | (structure) | (149) and |

TABLE 5-continued

| Ex. | Dye isomer mixture | |
|---|---|---|

(150). 3-(NH-CO-CH₃)-C₆H₄-N=N-[4-(2-methyl-4-hydroxyphenylazo)-6-sulfo-naphth-1-yl]

26  (151) and (152): 3-(NH-CO-CH₂-CH₃)-C₆H₄-N=N-[4-(4-hydroxyphenylazo)-6-sulfo-naphth-1-yl]  (two isomers shown)

27  (153) and (154): 4-(H₂NOC)-C₆H₄-N=N-[4-(2-methyl-4-hydroxyphenylazo)-6-sulfo-naphth-1-yl]

28  (155) and: 3-(CONH₂)-C₆H₄-N=N-[4-(2-methyl-4-hydroxyphenylazo)-6-sulfo-naphth-1-yl]

TABLE 5-continued

| Ex. | Dye isomer mixture | |
|---|---|---|
| | [structure: 3-carbamoylphenyl-N=N-naphthalene(SO3H)-N=N-(2-methyl-4-hydroxyphenyl)] | (156). |
| 29 | [structure: 3-(N-hydroxyethylcarbamoyl)phenyl-N=N-naphthalene(SO3H)-N=N-(2-methyl-4-hydroxyphenyl)] | (157) and |
| | [structure: 3-(N-hydroxyethylcarbamoyl)phenyl-N=N-naphthalene(SO3H)-N=N-(2-methyl-4-hydroxyphenyl)] | (158). |
| 30 | [structure: 3-(propionylamino)phenyl-N=N-naphthalene(SO3H)-N=N-(2-methyl-4-hydroxyphenyl)] | (159) and |
| | [structure: 3-(propionylamino)phenyl-N=N-naphthalene(SO3H)-N=N-(2-methyl-4-hydroxyphenyl)] | (160). |

The dyes comprising the mixtures of isomers listed in Table 5 can also be obtained individually by using the corresponding individual compound instead of a mixture of isomers according to Examples 1 to 5.

EXAMPLE 31

5.4 parts of the mixture of isomeric compounds of the formulae (143) and (144) obtainable according to Example 22 are stirred at a temperature of 50° to 55° in 50 parts of water and one part of concentrated sodium hydroxide solution. 2-Chloroethanol is then added dropwise in excess over a period of 2 to 4 hours during which the pH is maintained at a value of 11 to 12 by addition of concentrated sodium hydroxide solution. Stirring of the reaction mixture at a temperature of 50° to 55° is continued for 4 hours, the reaction product, after cooling to room temperature and with the addition of sodium chloride, is filtered off, washed with 50 parts of 15% sodium chloride solution and dried, giving 6 parts of a reaction product which, in the form of the free acid corresponds to the mixture of isomers comprising the compounds of the formulae

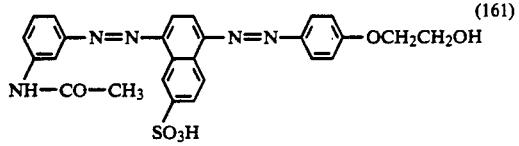

(161)

and

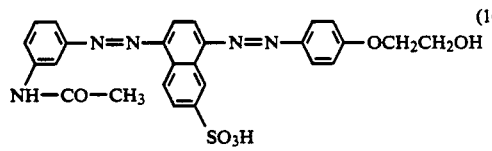

(162)

The mixture of dye isomers of the formulae (161) and (162) dyes natural and synthetic polyamide fibre material in orange hues.

The dyes of the formulae (161) and (162) can also be obtained individually by using in Example 31 the corresponding individual compound instead of a mixture of the compounds of the formulae (143) and (144).

EXAMPLES 32 to 39

The procedure described in Example 31 is repeated, except that an equimolar amount of a mixture of isomers according to one of Examples 23 to 30 is used instead of 5.4 parts of the mixture of isomers obtainable according to Example 22 giving the dye isomer mixture listed in Table 6 in the form of the free acids, which dye natural and synthetic polyamide fibre material in orange hues.

TABLE 6

| Ex. | Dye isomer mixture | |
|---|---|---|
| 32 | (structure) | (163) and |
|  | (structure) | (164). |
| 33 | (structure) | (165) and |
|  | (structure) | (166). |

TABLE 6-continued
| Ex. | Dye isomer mixture |
|---|---|
| 34 | 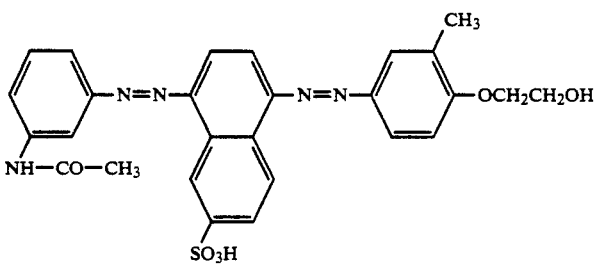 (167) and 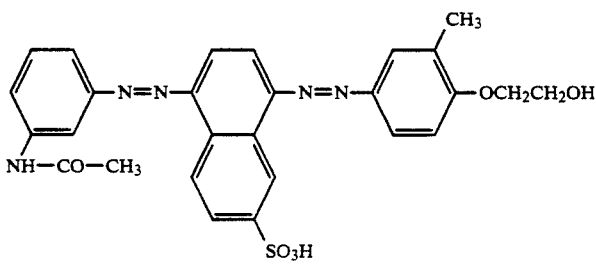 (168). |
| 35 | 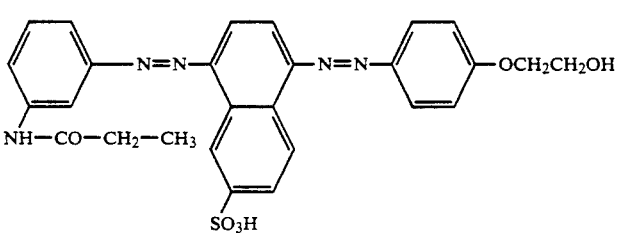 (169) and 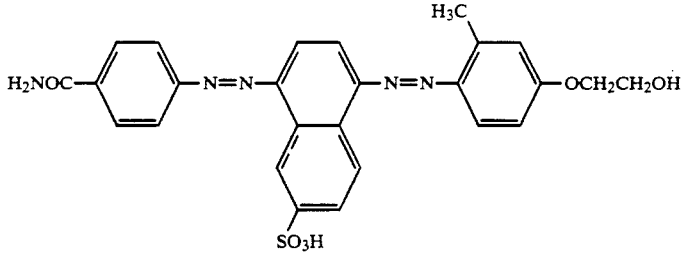 (170). |
| 36 | 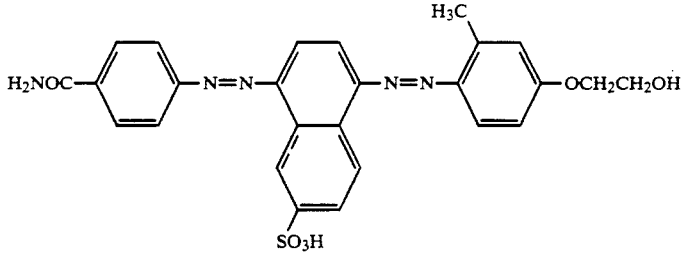 (171) and 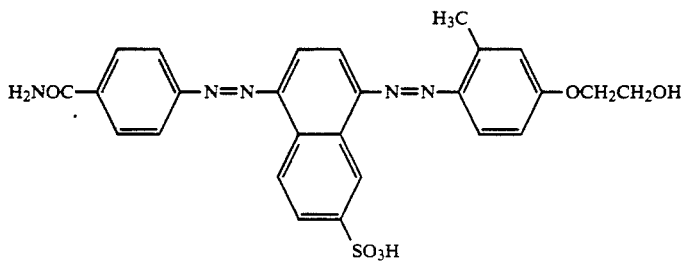 (172). |

TABLE 6-continued

| Ex. | Dye isomer mixture | |
|---|---|---|
| 37 | [structure: 3-CONH2-phenyl-N=N-naphthalene(SO3H)-N=N-(2-methyl-4-OCH2CH2OH-phenyl)] | (173) and |
|    | [structure: 3-CONH2-phenyl-N=N-naphthalene(SO3H isomer)-N=N-(2-methyl-4-OCH2CH2OH-phenyl)] | (174). |
| 38 | [structure: 3-CONHCH2CH2OH-phenyl-N=N-naphthalene(SO3H)-N=N-(2-methyl-4-OCH2CH2OH-phenyl)] | (175) and |
|    | [structure: 3-CONHCH2CH2OH-phenyl-N=N-naphthalene(SO3H isomer)-N=N-(2-methyl-4-OCH2CH2OH-phenyl)] | (176). |
| 39 | [structure: 3-(NH-CO-CH2-CH3)-phenyl-N=N-naphthalene(SO3H)-N=N-(2-methyl-4-OCH2CH2OH-phenyl)] | (177) and |
|    | [structure: 3-(NH-CO-CH2-CH3)-phenyl-N=N-naphthalene(SO3H isomer)-N=N-(2-methyl-4-OCH2CH2OH-phenyl)] | (178). |

The dyes comprising the mixtures of isomers listed in Table 6 can also be obtained individually by using the

EXAMPLE 40

The procedure described in Examples 35 is repeated, except that dimethyl sulfate is used instead of 2-chloroethanol, giving a reaction product which, in the form of the free acid, corresponds to the mixture of isomers comprising the dyes of the formulae

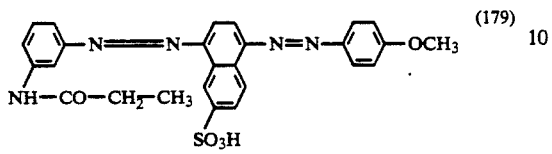   (179)

and

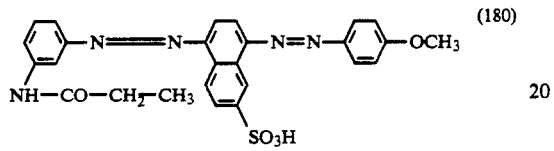   (180)

The mixture of dye isomers of the formulae (179) and (180) dyes natural and synthetic polyamide fibre material in orange hues.

The dyes of the formulae (179) and (180) can also be obtained individually by using in Example 40 the corresponding individual dye instead of the mixture of dye isomers of the formulae (151) and (152).

DYEING EXAMPLE 1

10 parts of a nylon 6,6 fabric (Helanca knitted fabric) are dyed in 500 parts of an aqueous liquor which contains 2 g/l of ammonium acetate and is brought to a pH of 5 with acetic acid. The dyes used are 0.64% of the yellow dye of the formula

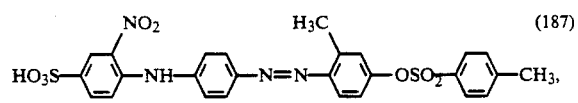   (187)

0.12% of the red mixture of dye isomers of the formulae

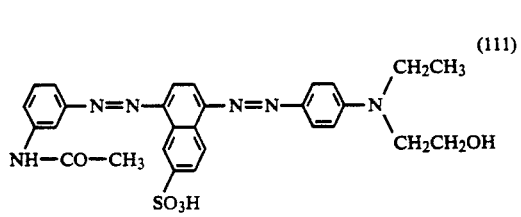   (111)

and

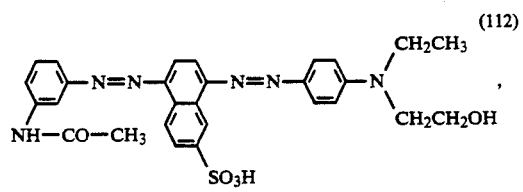   (112)

and 0.05% of the blue mixture of dye isomers of the formulae

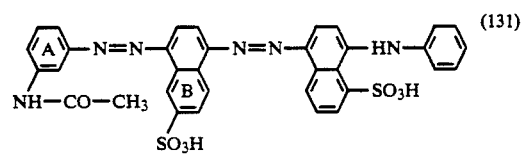   (131)

and

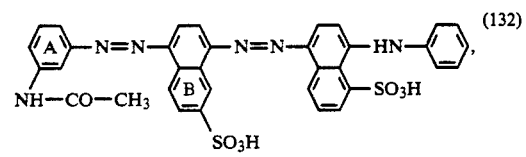   (132)

the amounts given being based on the fibre weight. The dyeing time at a temperature of 60° to 98° is 30 to 90 minutes. The dyed piece of Helanca fabric is then removed from the dye liquor and rinsed and dried as usual. This gives a piece of fabric which has been dyed completely levelly in a brown shade and has good general fastness properties.

DYEING EXAMPLES 2 TO 18

The procedure described in Dyeing Example 1 is repeated, except that the dyes or dye isomer mixtures listed in Table 7 below in column 2 are used instead of 0.64% of the yellow dye of the formula (187) and 0.12% of the red mixture of dye isomers of the formulae (111) and (112) and 0.05% of the blue mixture of dye isomers of the formulae (131) and (132), giving pieces of fabric which have been dyed completely levelly in the hue given in column 3.

TABLE 7

| Dyeing Example | Dyes or dye isomer mixtures | Hue |
|---|---|---|
| 2 | 0.64% of the yellow dye of the formula (187), 0.13% of the red dye isomer mixture of the dyes of the formulae (113) and (114), 0.08% of the blue dye isomer mixture of the dyes of the formulae (133) and (134). | brown |
| 3 | 0.32% of the yellow dye isomer mixture of the dyes of the formulae (165) and (166), 0.11% of the red dye isomer mixture of the dyes of the formulae (123) and (124), 0.08% of blue dye isomer mixture of the dyes of the formulae (133) and (134). | brown |
| 4 | 0.64% of the yellow dye of the formula (187), 0.13% of the red dye isomer mixture of the dyes of the formulae (113) and (114), | brown |

TABLE 7-continued

| Dyeing Example | Dyes or dye isomer mixtures | Hue |
|---|---|---|
| | 0.25% of the blue dye of the formula | |

*(Structure 188: anthraquinone with NH₂, SO₃H, and substituted arylamino group bearing CH₃, CH₃, H₃C, H₃C, and CH₂—NH—C(=O)—phenyl substituents)*

(188).

| | | |
|---|---|---|
| 5 | 0.64% of the yellow dye of the formula (187), 0.11% of the red dye isomer mixture of the dyes of the formulae (123) and (124), 0.25% of the blue dye of the formula (188). | brown |
| 6 | 0.64% of the yellow dye of the formula | brown |

*(Structure 189: triazine-based azo dye with phenyl, N-C₂H₅, chloro-triazine, —HN—phenyl(SO₃H)—N=N— linked to HO/H₃C enol-hydrazone bearing N—(2-chlorophenyl))*

(189),

| | | |
|---|---|---|
| | 0.15% of the red dye isomer mixture of the dyes of the formulae (123) and (124), 0.25% of the blue dye of the formula (188). | |
| 7 | 0.1% of the red dye isomer mixture of the dyes of the formulae (113) and (114), 1.8% of the blue dye of the formula (188). | blue |
| 8 | 0.1% of the red dye isomer mixture of the dyes of the formulae (111) and (112), 1.8% of the blue dye of the formula (188). | blue |
| 9 | 0.4% of the yellow dye of the formula (187), 0.1% of the red dye isomer mixture of the dyes of the formulae (113) and (114), 1.4% of the blue dye of the formula (188). | grey |
| 10. | 0.6% of the yellow dye of the formula (187), 0.1% of the red dye isomer mixture of the dyes of the formulae (113) and (114), 1.2% of the blue dye of the formula (188). | grey |
| 11 | 0.1% of the yellow dye of the formula (187), 0.4% of the red dye isomer mixture of the dyes of the formulae (113) and (114), 0.1% of the blue dye of the formula (188). | bordeaux |
| 12 | 0.2% of the yellow dye of the formula (187), 0.4% of the red dye isomer mixture of the dyes of the formulae (123) and (124). | bordeaux |
| 13 | 0.1% of the yellow dye of the formula (187), 0.4% of the red dye isomer mixture of the dyes of the formulae (111) and (112). | bordeaux |
| 14 | 1.0% of the yellow dye of the formula (187), 0.1% of the red dye isomer mixture of the dyes of the formulae (111) and (112), 0.8% of the blue dye of the formula (188). | olive-grey |
| 15 | 0.7% of the yellow dye of the formula (187), 0.15% of the red dye isomer mixture of the dyes of the formulae (113) and (114). | light brown |
| 16 | 1.5% of the yellow dye isomer mixture of the dyes of the formulae (165) and (166), 4.0% of the blue dye isomer mixture of the dyes of the formulae (133) and (134). | black |
| 17 | 1.5% of the yellow dye isomer mixture of the dyes of the formulae (165) and (166), 4.0% of the blue dye isomer mixture of the dyes of the formulae (131) and (132). | black |
| 18. | 4.0% of the yellow dye of the formula | black |

TABLE 7-continued

| Dyeing Example | Dyes or dye isomer mixtures | Hue |
|---|---|---|

Structure (190):

benzene(SO₃H) —N=N— benzene(OCH₃) —N=N— benzene—OCH₃  (190), 2.0% of the red dye isomer mixture of the dyes of the formulae (113) and (114),
4.0% of the blue dye isomer mixture of the dyes of the formulae (133) and (134).

DYEING EXAMPLE 19

10 parts of a nylon 6,6 fabric are dyed in 500 parts of an aqueous liquor which contains 2 g/l of ammonium acetate and is brought to a pH of 5 with acetic acid. The proportion of the mixture of dye isomers according to Example 6 is 0.7%, relative to the fibre weight. The dyeing time at a temperature of 98° is 30 to 90 minutes.

The dyed nylon 6,6 fabric is then removed from the dyebath and washed and dried as usual.

This gives a bordeaux-coloured nylon 6,6 fabric which has a pure shade and good overall fastness properties.

DYEING EXAMPLE 20

10 parts of a nylon 6,6 fabric are dyed in 500 parts of an aqueous liquor which contains 1 g/l of monosodium phosphate and is brought to a pH of 6 with disodium phosphate. The proportion of the mixture of dye isomers according to Example 17 is 1%, relative to the fibre weight. The dyeing time at a temperature of 98° is 30 to 90 minutes. The dyed nylon 6,6 fabric is then removed from the dyebath and washed and dried as usual.

This gives a blue-coloured nylon 6,6 fabric which has a pure shade and good overall fastness properties.

DYEING EXAMPLE 21

10 parts of a wool piece are dyed in 500 parts of an aqueous liquor. The proportion of the dye of the formula (111) is 0.45%, that of calcined Glauber salt 5% and that of 80% acetic acid 2%. The dyeing time at a temperature of 98° is 30–60 minutes. The bordeaux-coloured wool piece washed and dried as usual has very good general fastness properties.

DYEING EXAMPLE 22

100 parts of chrome cattlehide leather (shaved weight) are washed in 300 parts of water at a temperature of 30° for 15 minutes and then neutralised in a liquor comprising 300 parts of water, 2 parts of neutralising agent (sodium salts of aromatic sulfonic acids and aliphatic dicarboxylic acids) and 0.5 part of sodium bicarbonate at 30° for 60 minutes. This is followed by a washing operation lasting for 15 minutes in 300 parts of water at room temperature. The leather thus treated is then dyed in a fresh liquor comprising 300 parts of water and 0.5 part of the mixture of dye isomers of the formulae (141) and (142) according to Example 21 at 50° C. for 30 minutes. 3 parts of a fatliquoring agent (preparation based on sulfonated chloroparaffin) and, after another 30 minutes, 0.5 part of 85% formic acid are then added to the dyeing liquor. Dyeing is continued for another 30 minutes at the same temperature, and the dyed leather is rinsed and finished as usual, giving a level bordeaux dyeing.

DYEING EXAMPLE 23

100 parts of chrome cattlehide leather (shaved weight) are neutralised by the procedure of Dyeing Example 22 and then treated in the same liquor with 7 parts of a liquid synthetic retanning agent (condensation product of polyphenolic sulfonic acids with formaldehyde and urea) at 30° for another 60 minutes. This is followed by a washing operation lasting 15 minutes in 300 parts of water at room temperature. This retanned chrome cattlehide leather is now dyed at 50° in a liquor comprising 300 parts of water and 1.0 part of the mixture of dye isomers of the formulae (141) and (142) according to Example 21. After a dyeing time of 30 minutes, 3 parts of the synthetic fatliquoring agent according to Dyeing Example 22 are added, followed, after another 30 minutes, by the addition of 1 part of 85% formic acid. After acidification, the treatment is continued at 50° for another 30 minutes. The leather is then rinsed in cold water and finished.

What is claimed is:

1. A dye mixture which contains at least two dyes of the formula

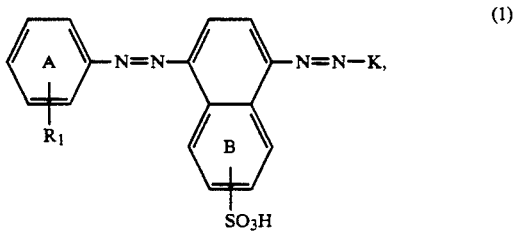

(1)

in which R₁ is a radical of the formula —NH—CO—R₂ or —CO—N(R₃)R₄, R₂ is amino or unsubstituted or halogen-, hydroxyl- or $C_1$-$C_4$alkoxy-substituted $C_1$-$C_4$alkyl, R₃ and R₄, independently of one another, are hydrogen, $C_1$-$C_4$alkyl or $C_2$-$C_4$hydroxyalkyl, and K is a radical of the formula

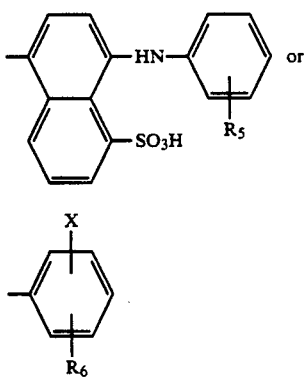

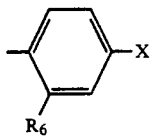

$R_5$ and $R_6$ are hydrogen or $C_1$–$C_4$alkyl, X is $C_1$–$C_4$alkoxy, $C_2$–$C_4$hydroxyalkoxy or a radical of the formula —N($R_7$)$R_8$ and $R_7$ and $R_8$, independently of one another, are $C_1$–$C_4$alkyl which is unsubstituted or substituted by hydroxyl or by phenyl which may be further substituted, in which, if $R_1$ is the group —NH—CO—$R_2$ and K is a radical of the formula (2), the group —NH—CO—$R_2$ is bound to the benzene ring A in the 3 position, relative to the azo group.

2. A dye mixture according to claim 1, in which $R_1$ is a radical of the formula —NH—CO—$R_2$ and $R_2$ is as defined in claim 1, K is a radical of the formula (2) or a radical of the formula

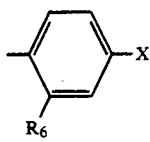

$R_6$ is as defined in claim 1 and X is $C_1$–$C_4$alkoxy, $C_2$–$C_4$ hydroxyalkoxy or a radical of the formula —N($R_7$)$R_8$ and $R_7$ and $R_8$, independently of one another, are $C_1$–$C_4$alkyl or $C_2$–$C_4$hydroxyalkyl, in which, if K is a radical of the formula (2), the group —NH—CO—$R_2$ is bound to the benzene ring A in the 3 position, relative to the azo group.

3. A dye mixture according to claim 1, in which $R_2$ is $C_2$–$C_4$alkyl.

4. A dye mixture according to claim 1, in which the radical $R_1$ is bound to the benzene ring A in the 3 position, relative to the azo group.

5. A dye mixture according to claim 1, in which K as radical of the formula (3) is a radical of the formula (4)

in which X is as defined in claim 1 and $R_6$ is hydrogen or methyl.

6. A dye mixture according to claim 1, in which X is $C_1$–$C_4$alkoxy, $C_2$–$C_4$hydroxyalkoxy or a radical of the formula —N($R_7$)$R_8$ and $R_7$ and $R_8$, independently of one another, are $C_1$–$C_4$alky or $C_2$–$C_4$hydroxyalkyl.

7. A dye mixture according to claim 1, in which K is a radical of the formula

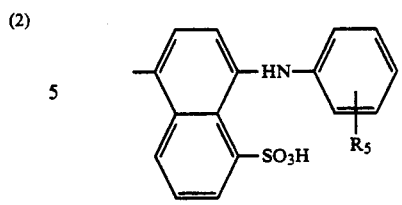

and $R_5$ is hydrogen or methyl.

8. A dye mixture according to claim 1, wherein one dye is of the formula

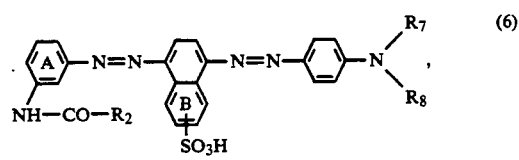

in which $R_2$ is methyl or ethyl and $R_7$ and $R_8$, independently of one another, are ethyl or β-hydroxyethyl, and the second is of the formula

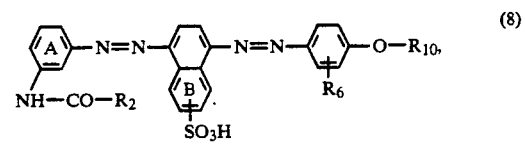

in which $R_2$ is methyl or ethyl, $R_6$ is hydrogen or methyl and $R_{10}$ is methyl, ethyl or β-hydroxyethyl.

9. A dye mixture which contains at least two dyes according to claim 1, one of which is of the formula

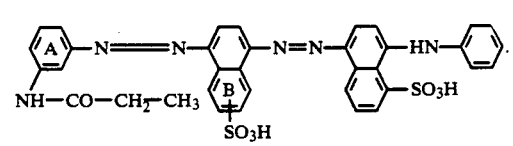

10. A process for the dyeing and printing of nitrogen-containing or hydroxyl-containing fibre materials, which comprises applying a dye mixture according to claim 1 to said fibre materials.

11. A process for the trichromatic dyeing or printing of natural or synthetic polyamide fibre materials, by applying thereto at least one red-dyeing dye of the formula (5) 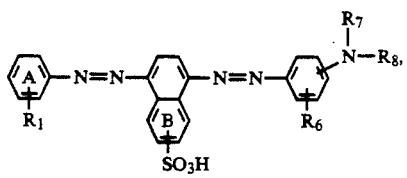

in which $R_1$ is a radical of the formula $-NH-CO-R_2$ or $-CO-N(R_3)R_4$, $R_2$ is amino or unsubstituted or halogen-, hydroxyl- or $C_1$-$C_4$alkoxy-substituted $C_1$-$C_4$alkyl, $R_3$ and $R_4$, independently of one another, are hydrogen, $C_1$-$C_4$alkyl or $C_2$-$C_4$hydroxyalkyl, $R_6$ is hydrogen or $C_1$-$C_4$alkyl and $R_7$ and $R_8$, independently of one another, are $C_1$-$C_4$alkyl which is unsubstituted or substituted by hydroxyl or by phenyl which may be further substituted, together with at least one yellow- or orange-dyeing dye and at least one blue-dyeing dye.

* * * * *